Figure 1:
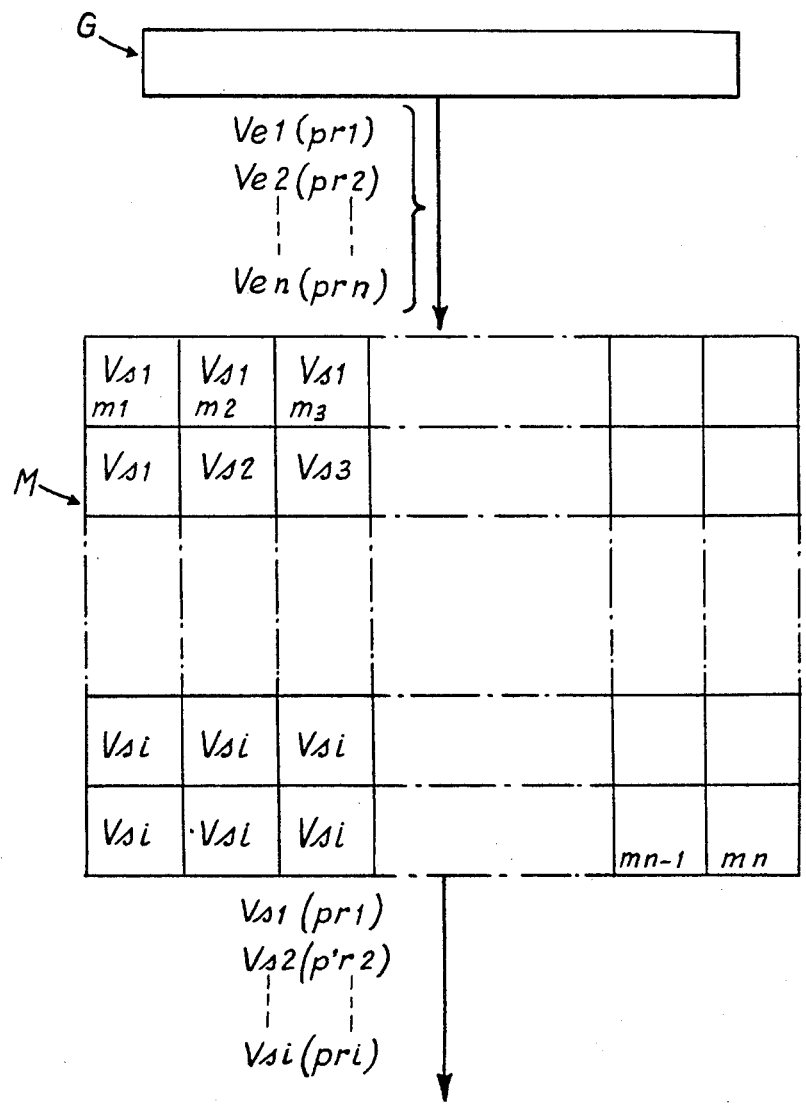

United States Patent [19]

David et al.

[11] Patent Number: 4,730,319
[45] Date of Patent: Mar. 8, 1988

[54] DEVICE FOR TRANSFORMING THE OCCURRENCE PROBABILITY OF LOGIC VECTORS AND FOR THE GENERATION OF VECTOR SEQUENCES WITH TIME VARIABLE PROBABILITIES

[75] Inventors: René David, Saint-Egreve; Xavier Fedi, St-Martin d'Hères, both of France

[73] Assignee: Centre National de la Recherche Scientifique, Paris, France

[21] Appl. No.: 744,013

[22] PCT Filed: Oct. 12, 1984

[86] PCT No.: PCT/FR84/00229

§ 371 Date: Jun. 7, 1985

§ 102(e) Date: Jun. 7, 1985

[87] PCT Pub. No.: WO85/01813

PCT Pub. Date: Apr. 25, 1985

[30] Foreign Application Priority Data

Oct. 13, 1983 [FR] France .................................. 83 16285

[51] Int. Cl.⁴ ............................................. G01R 31/28
[52] U.S. Cl. ............................................ 371/27; 371/20
[58] Field of Search ................. 371/20, 25, 27, 16; 324/73 R, 73 AT, 73 PC

[56] References Cited

U.S. PATENT DOCUMENTS

| | | | |
|---|---|---|---|
| 3,614,608 | 10/1971 | Gledd et al. ................. | 324/73 R |
| 3,719,885 | 3/1973 | Carpenter et al. ............ | 324/73 R |
| 3,781,829 | 12/1973 | Singh .......................... | 371/27 |
| 4,161,041 | 7/1979 | Butler et al. ................. | 365/244 |
| 4,493,045 | 1/1985 | Hughes, Jr. ................... | 371/27 X |
| 4,598,401 | 7/1986 | Whelan ........................ | 371/25 |

OTHER PUBLICATIONS

A. J. Walker, New Fast Method for Generating Discrete Random Numbers with Abitrary Frequency Distributions, Electronics Letters, vol. 10, No. 8, Apr. 18, 1974, pp. 127–128.

Primary Examiner—Charles E. Atkinson
Attorney, Agent, or Firm—McAulay, Fields, Fisher, Goldstein & Nissen

[57] ABSTRACT

To provide a random device for randomly testing logic circuits, particularly microprocessors, it is necessary to use a device for transforming the occurrence probability of logic vectors to produce vectors sequences having time-changing probabilities. Such a device comprises a memory or an equivalent circuit to which are applied input logic vectors (Ve1, Ve2 . . . Vn) having respective occurrence probabilities which are different or the same and containing, in the respective areas of different range, the different categories of output vectors (Vs1, Vs2 . . . Vsi). Thereby the occurrence probability of a predetermined output vector (Vs1, Vs2 . . . Vsi) depends both on the range of the memory area wherein said vector is stored, that is to say the number of elementary positions or eight-bit bytes which are included within said area, and on the respective probabilities (pr1, pr2 . . . prn) of the input vectors (Ve1, Ve2 . . . Ven) corresponding to the addresses of the elementary positions, m1, m2 . . . mn) of the area of the memory in question.

14 Claims, 3 Drawing Figures

DEVICE FOR TRANSFORMING THE OCCURRENCE PROBABILITY OF LOGIC VECTORS AND FOR THE GENERATION OF VECTOR SEQUENCES WITH TIME VARIABLE PROBABILITIES

The present invention relates to a device for transforming the occurrence probability of logic vectors and for generating vector sequences with time variable probabilities, applicable in particular to the production of a random testing device for logic circuits, particulary microprocessors.

In various domains of data processing, it is necessary to be able to have available, for particular applications, logic vector sequences with given probabilities. Such is for example the case of random testing devices for logic circuits such as microprocessors. In fact, to monitor logic circuits such as microprocessors, the functioning of two of these microprocessors, namely a reference microprocessor and the microprocessor subjected to the test, is compared. To this end, a sequence of instructions and orders is sent in parallel to the two microprocessors and a bit by bit comparison is made of the outputs of the two microprocessors. Any discordance appearing during such comparison makes it possible to detect a defect in the microprocessor subjected to the test.

It is an object of the present invention to procure a device for transforming the occurrence probability of logic vectors so as to produce, at the output of this device, vector sequences with given probabilities, from input vectors which may be equiprobable or themselves have different occurrence probabilities, this device advantageously being able to be used for the production of vector sequences with given probabilities applied to two logic circuits, in order to compare the functioning of one of these circuits with respect to another reference circuit.

To this end, this device for transforming the occurrence probability of logic vectors is characterized in that it comprises a memory or an equivalent circuit to which are applied input logic vectors having different or equal respective occurrence probabilities and containing, in respective areas of different ranges, the different categories of output vectors so that the occurrence probability of a determined output vector depends both on the range of the area of memory in which this vector is stored, i.e. on the number of elementary positions or eight bit bytes that this zone covers, and the respectives probabilities of the input vectors corresponding to the addresses of the elementary positions of the area of memory in question.

The invention also relates to a device generating sequences of vectors with time-variable probabilities, using at least one device for transforming the occurrence probability of logic vectors such as above mentioned characterized in that it comprises memories or equivalent circuits containing the different categories of vectors as well as the information necessary for identifying these different categories, and a sequencer based on logic circuits allowing the sequencing of the different types of vectors in time, as a function of given realtionships, the outputs of the memories or equivalent circuits being connected, via switches to one or more circuits adapted to receive them, such as for example microprocessors.

A particular application of the invention is constituted by a random testing device for logic circuits, particularly microprocessors, using at least one device for transforming the occurrence probability of logic vectors. This random testing device comprising a central unit, a generator of random sequences of instructions and orders applied in parallel to a reference microprocessor and to the microprocessor being tested, a comparator at the imputs of which are connected the data, address and monitoring outputs of each microprocessor and of which the output is connected to the central unit, is characterized in that the random sequence generator comprises a shift register looped as a sequence generator of maximum period by an exclusive OR circuit, the cells of the register corresponding to certain bits defined by a known mathematical property being connected to the inputs of the exclusive OR circuit, so that the shift register allows a pseudorandom generation of equiprobable vectors, which are applied to a generator of vector sequences with given probabilities which comprises memories or equivalent circuits containing the different categories of vectors as well as the information necessary for identifying these different categories, and a sequencer based on logic circuit allowing the sequencing of the different types of vectors in time, as a function of given relationships, the outputs of the memories being connected, via switches, both to the reference microprocessor and to the microprocessor being tested.

The random testing device comprises, for example, concerning the instructions, three memories, namely a first memory for storing the data, a second memory for storing the operation codes and a third memory for storing the number of cycles corresponding to the various operation codes, on the one hand, and a fourth memory for storing the types of order and a fifth memory for storing the numbers of cycles corresponding to the various respective orders, on the other hand, the outputs of the first and second memory being connected, respectively by busses to a first switch of which the output is connected in parallel, by a data bus to the refrence microprocessor and to the microprocessor being tested, the output of the third memory being connected in parallel, via a bus, to a first counter controlling, by a link the first switch, the output of the fourth memory being connected, through a second switch, to an order bus connected in parallel to the two microprocessors and the fifth memory being connected by its output on the one hand to the first counter and on the other hand to a second counter controlling the second switch.

The random testing device according to the invention offers the advantage that it makes it possible to allocate probabilities to each vector and no longer to each bit of a vector as was known heretofore. Furthermore, it makes it possible to furnish a sequence of vectors which is constituted by vectors which are drawn from different memory fields (with different probabilities) by respecting certain constraints (the number of any eight bit bytes whatsoever according to an operation code depending on this operation code). In addition, a control vector sequence elaborated in parallel with the first reacts on the elaboration of the first vector sequence.

The invention will be more readily understood on reading the following description with reference to the accompanying drawings, in which:

FIG. 1 is a block diagram of a device for transforming the occurrence probability of logic vectors.

Figure 2:
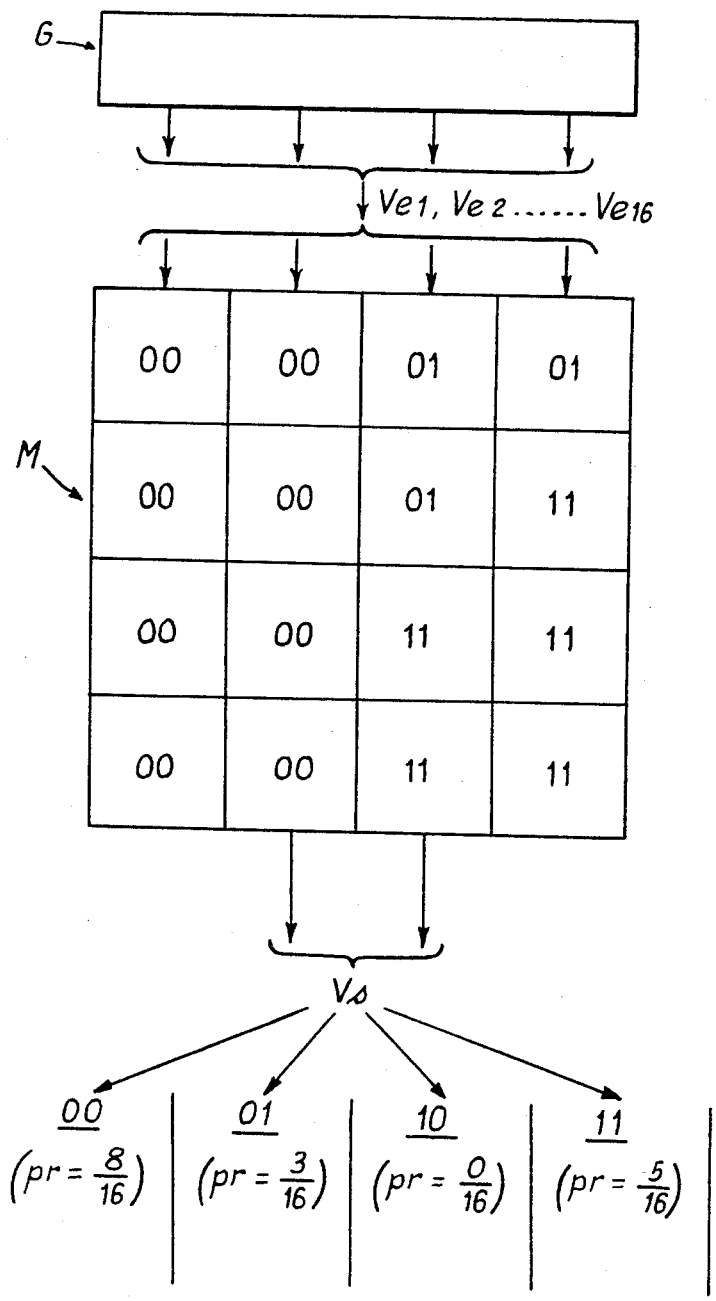

FIG. 2 of the device is an application with a memory with sixteen elementary position areas and equiprobable input vectors.

Figure 3:
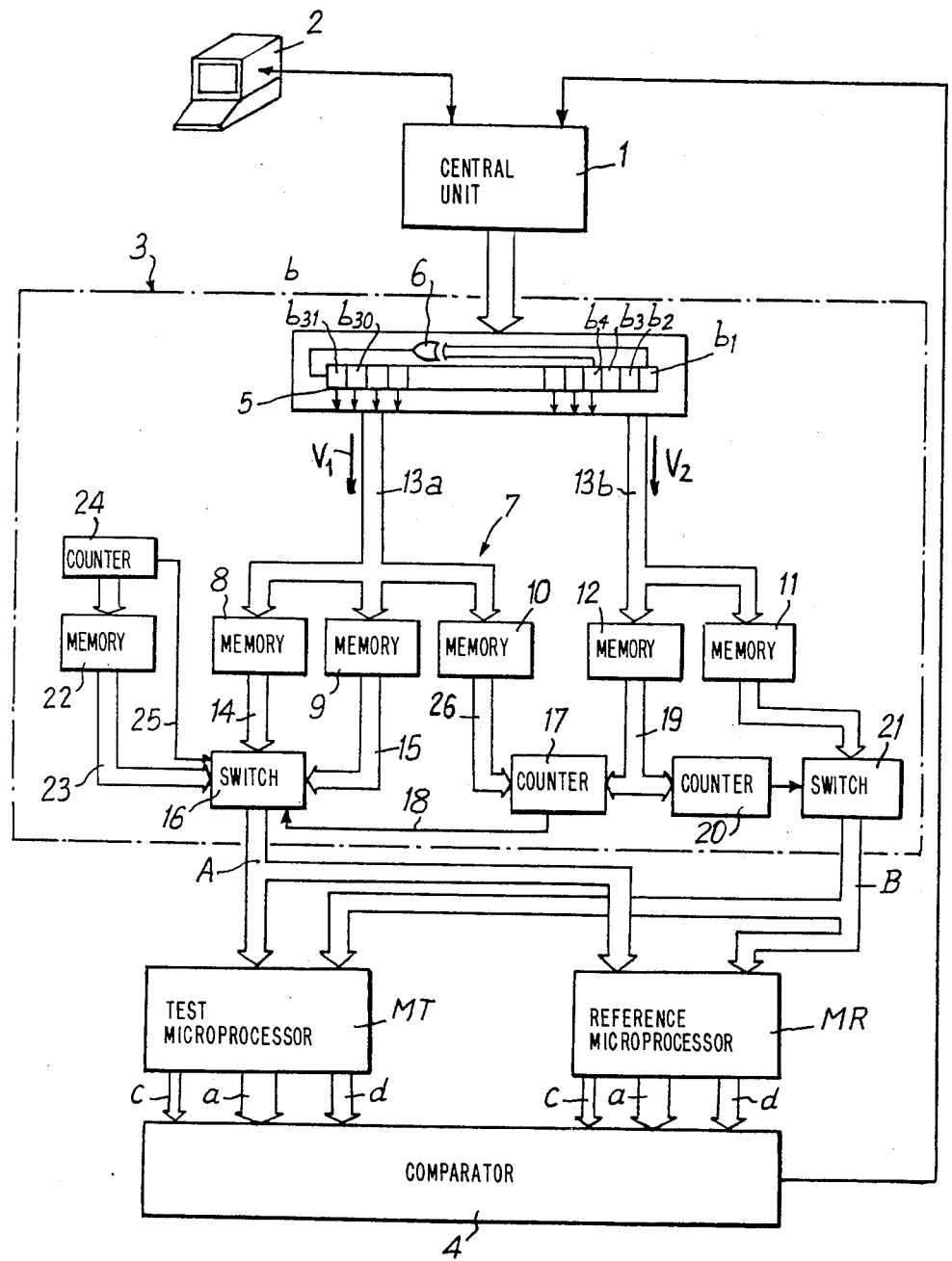

FIG. 3 is a block diagram of an application to a random testing device for microprocessors.

The device according to the invention which is shown schematically in FIG. 1 comprises a memory M with n elementary positions m1,m2 . . . mn in each of which may be stored a logic vector constituted by a series of bits, forming for example an eight bit byte. The total field of the memory is subdivided into a certain number of areas of different ranges, depending on the occurrence probabilities which it is desired to obtain, at the output of memory M, for the different logic vectors contained in this memory. The memory M is addressed by means of generator G delivering at its output input logic vectors Ve1,Ve2 . . . Ven each corresponding to a respective address in the memory M. Vector Ve1 is allocated to the address of the elementary position m1, vector Ve2 to the address of position m2, etc.. The occurrence probabilities pr1,pr2 . . . prn of the input logic vectors Ve1, Ve2 . . . Ven may be the same or, on the contrary, different from one another, depending on the structure of the vector generator G.

According to the invention, the output vectors which it is desired to obtain are loaded into memory M, so that said vectors occupy, in memory M, areas of different ranges, in other words that they are stored in different numbers in this memory. For example, the output vector Vs1 may be stored in the first three elementary address positions m1,m2,m3 (see the upper left-hand corner of FIG. 1), whilst another output vector such as vector Vs5 may be stored in six other elementary positions of the memory M (see the lower left-hand corner of FIG. 1). It is therefore seen that the occurrence probabilities p'r1, p'r2 . . . p'ri of the respective output vectors Vs1,Vs2 . . . Vsi, depend both on the range of the areas of the memory M in which these various output vectors are stored and on the occurrence probability of the input vectors Ve1,Ve2 . . . Ven allocated to the different addresses of the elementary positions of the memory.

FIG. 2 schematically illustrates, by way of example, the case of using a memory M with sixteen elementary position each containing two bits and consequently the generator of input logic vectors emits at its output sixteen vectors Ve1, Ve2 . . . Ve16, these vectors being equiprobable. These sixteen vectors are respectively allocated to the addresses of the sixteen memory positions.

FIG. 2 shows a logic vector 00 stored in eight memory positions, a logic vector 01 stored in three memory positions (see left side of FIG. 2), a logic vector 11 stored in five memory positions, whilst the logic vector 10 is not stored in memory M. The result of this is that the occurrence probability pr of the output logic vector 00 is 8/16, that of vector 01 is 3/16, that of vector 10 is equal to 0 and that of vector 11 is 5/16. It is therefore seen that these occurrence probabilities may be varied by modifying the plan of loading of the memory.

A particular form of application of the invention for effecting a random test on logic circuits such as microprocessors will now be described with reference to FIG. 3.

The random testing device shown in FIG. 3 comprises a central unit 1 constituted for example by an 80-10 INTEL card, connected to a display console 2 in order to allow a dialogue with the operator. This central unit 1 is connected to a generator 3 producing at its output, during the test, a random sequence of instructions on random data, on a data bus A, and in parallel, orders sent, likewise in random manner, on a bus B. The two busses A and B are respectively connected to a reference microprocessor MR and to a microprocessor MT which is subjected to the test. The data, address and monitoring outputs of these microprocessors are transmitted, respectively, by busses d, a and c, to the corresponding inputs of a comparator 4 which thus makes a bit by bit comparison of the outputs of the two microprocessors MR and MT. The output of comparator 4 is connected to the control unit 1 which, in addition to the dialogue with the operator via the display console 2, allows initialization and production of certain parameters of the generator 3 and the exploitation of the results of the test.

The generator 3 comprises a shift register 5 looped as a sequence generator of maximum period by an exclusive OR circuit 6. This register allows a pseudo-random generation of equiprobable vectors. Vector is understood to mean the combination of an assembly of bits juxtaposed in the register 5. This shift register may comprise, for example, 31 cells corresponding to bits $b_1$, $b_2 \ldots b_{31}$. To obtain, in the cell corresponding to bit $b_{31}$, a succession of bits constituting a pseudo-random sequence, the cells corresponding to bits of rows $b_1$ and $b_4$ are connected to the inputs of the exclusive OR circuit 6.

The circuit thus defined effects, at each clock pulse, a shift which gives the values of the 31 bits at time $t+1$ as a function of the 31 bits at time t.

Among bits $b_1,b_2 \ldots b_{31}$, a certain number, for example 28, namely bits $b_4 \ldots b_{31}$, are used to constitute the equiprobable vectors.

To allow the independence of two consecutive vectors, the equivalence of twenty eight phase shifts is effected at each clock pulse by effecting twenty eight loopings instead of one. The circuit made is therefore not exactly the one indicated, but a circuit which is easily deduced therefrom so that one clock pulse gives the values which would have been obtained at time $t+28$, as a function of the 31 bits at time t.

The number of consecutive independent vectors that may be obtained is equal to $2^n - 1^n$, being the number of cells of the shift register 5 (n=31 in the particular case in question). In order to have the maximum number of vectors, the number N of bits of the vectors, 28 in the example in question, and $2^n - 1$ must be prime numbers between them.

The equiprobable vectors of 28 bits issueing from the shift register 5 are applied to a generator 7 of vector sequences with given probabilities whichis in fact of the type described hereinabove with reference to FIG. 2. The purpose of this generator is to produce, from the random sequence of equiprobable vectors furnished by the shift register 5, a random sequence of instructions (or of codes of operations) followed by data as well as orders. In the particular case of the microprocessor subjected to the test being of the M 6800 type, the field of instructions may be limited to the 197 codes of operations of this microprocessor whilst the field of data may cover the 256 possible configurations of the 8-bit words. The occurrence probabilities of the different vectors (data or instructions) may be variable, as well as those of the orders.

The generator 7 of vector sequences with given probabilities comprises, as far as the instructions are concerned, three memories (of the read-write RAM memory or readonly ROM memory type) namely a memory 8 for storing the data, a memory 9 for storing the operation codes and a memory 10 for storing the numbers of cycles corresponding to the various operation codes. In the same way, generator 7 comprises, as far as the orders are concerned, a memory 11 for storing the types of order and another memory 12 for storing the numbers of cycles corresponding to the various respective orders.

Each memory 8, 9 and 10 operates in the same manner as memory M of FIGS. 1 and 2, as will be explained hereinafter. Each vector Vs comprises a data segment stored in the data memory 8, an operation code segment stored in operation code memory 9 and a number of cycle sequences stored in cycles storing memory 10.

Initially, the various memories 8,9,10,11,12 are loaded by subdividing the total field of each memory into a certain number of areas of different ranges, depending on the probabilities which it is desired to obtain at the output, each area extending in fact over a determined number of elementary positions, in each of which an eight bit byte may be loaded. For example, if memory 8 is considered allocated to the data, and if this memory has a total capacity of 2048 eight bit bytes, the 256 possible configurations for the data can be loaded eight times in this memory and an equiprobability of occurrence of each data is then found at the output. On the other hand, 1793 times 00 and once each of the 255 other data may also be loaded in this memory. At the output of the memory 8 there will then be an occurrence probability of $1793/2048 = \frac{7}{8}$ for 00 and 1/2048 for every other value.

The process is identical for memory 9 containing the operation codes and memory 11 containing the orders.

From vector $b_4 \ldots b_{31}$ are extracted two vectors corresponding to different bits, for example a first vector $V_1$ corresponding to bits $b_4 \ldots b_{14}$, and a second vector $V_2$ corresponding to bits $b_{15} \ldots b_{25}$, the total number of the bits of the two vectors $V_1$ and $V_2$ not exceeding 28 in the example in question. The two vectors $V_1$ and $V_2$ thus constituted are independent. They are sent, the first, $V_1$, on a bus 13a, and the second, $V_2$, on a bus 13b.

During the test, the equiprobable vectors $V_1$, $V_2$ issuing from the shift register 5 are sent respectively on the address bus 13a connected to the three memories 8,9,10 associated respectively with the data, with the operation codes and with the numbers of cycles, and on bus 13b connected to the two memories 11,12 associated with the orders. Each of these memories is therefore addressed in equiprobable mannre and the occurrence probability of a data, an operation code or an order at the output of the corresponding memory, depends in fact only on the number of times that this value has been loaded in the memory.

This device also makes it possible to mask certain data by allocating thereto a zero probability, i.e. by not loading them at all in memory 8.

The versatility of this device, from the viewpoint of the choice of probability, is naturally proportional to the size of the memory used.

The testing sequence is constructed as follows: an operation code corresponding to an instruction with p cycles is followed by (p−1) data. The operation code must be drawn at random from the field of the operation codes contained in memory 9 and in the same way the data must also be drawn at random from the field of data of memory 8. In the course of filling the memory 9 corresponding to the operation codes, the number of cycles corresponding to each operation code is loaded in parallel at the same address in memory 10. The outputs of memory 8 containing the data and of memory 9 containing the operation codes are connected, by busses 14 and 15, to a switch 16 of which the output is connected to bus A transmitting the data applied to the two microprocessors MR and MT.

Memory 10 is, for its part, connected, by a bus 26, to a counter 17. This counter 17 is connected to the switch 16 by a link 18. Thus, during a test, the two memories 8,9 are addressed simultaneously and at the same time as the operation code selected is extracted from memory 9 and is transmitted, by bus 15, switch 16 and bus A, to the two microprocessors MR and MT, the number of cycles stored in memory 10 is loaded simultaneously in counter 17, at the address corresponding to that of the operation code selected in memory 9. The counter 17 is decremented by one unit at each cycle and as long as it is not returned to zero, it maintains the switch 16 open, this enabling the data to be sent to the two microprocessors on bus A. When the counter 17 is returned to zero, the two microprocessors have finished executing the instruction and a new operation code may then be sent.

Functioning is quite similar as far as the orders are concerned. In fact, the output of memory 11 containing the various orders is connected to the bus B of the orders applied to the two microprocessors, whilst memory 12, containing the number of cycles corresponding to the respective orders, is also connected to the counter 17, via a bus 19. This bus 19 is also connected to an additional counter 20 acting on a switch 21 interposed on order bus B. The role of the counter 20 is to maintain an order for a period of time sufficient for correct execution thereof. The link to the counter 17 makes it possible to send an operation code at the moment when the microprocessor is expecting it, after execution of the order.

The random sequence generator 3 also comprises an additional memory 22 in which is stored an initialization sequence making it possible to place the two microprocessors MR and MT in the same state, before the test. This memory 22 is connected to switch 16 by a data bus 23 and it is addressed by a counter 24 likewise connected to switch 16 by a link 25.

From the foregoing description, it is seen that the random testing device according to the invention makes it possible to allocate a priori probabilities to each vector and this thanks to a distribution of the data, the operation codes and the orders, in the fields of the associated memories, chosen as desired.

The device according to the invention may admit variants, particularly for the comparison between the outputs produced by the tested circuit and by a circuit without breakdown. An advantageous variant is as follows: the variables transmitted by busses c,a and d leaving the microprocessor MT are processed by a circuit which performs a compact function, called signature, of all the bits that it receives. At the end of the testing sequence, this signature is compared with the signature of a good circuit, which signature is previously memorized. This signature of a good circuit may be obtained either by simulation, or by the use of a reference circuit.

What is claimed is:

1. A random testing device for logic circuits, particularly microprocessors, comprising:
   a central unit (1) having an input and an output;

a reference microprocessor (MR) and a test microprocessor (MT) to be tested, each said microprocessor having a data (d), an address (a) and a monitoring output (c);

a random sequence generator (3) for generating random sequences of instructions and orders, each applied in parallel to both said reference microprocessor and to said test microprocessor; and a comparator (4) having first and second inputs, each of which is connected to one of said data, address and monitoring outputs of each said microprocessor, and an output connected to the input of said central unit;

said random sequence generator (3) comprising:

(1) a shift register (5) looped as a sequence generator of maximum period by an exclusive OR circuit (6) having inputs, the cells of said shift register corresponding to certain bits defined by a known mathematical property and being connected to said inputs of said exclusive OR circuit (6);

(2) a vector sequence generator having an input connected with an output of said shift register for receiving therefrom equiprobable vectors of twenty-eight (28) bits issuing from said shift register, said vector sequence generator comprising for instructions:

(a) a first memory (8) for storing data, (b) a second memory (9) for storing operation codes, and (c) a third memory (10) for storing the number of cycles corresponding to the various operation codes; and said vector sequence generator comprising for orders:

(d) a fourth memory (11) for storing the types of orders, and (e) a fifth memory (12) for storing the number of cycles corresponding to the various respective orders, means including said shift register (5) for allowing a pseudo-random generation of equiprobable vectors for application to said vector sequence generator;

said means including said first memory (8) for storing data, said second memory (9) for storing operation codes, and said third memory (10) for storing the number of cycles corresponding to the various operation codes, to provide instructions;

first and second switches (16, 21) for transferring data supplied thereto to said two microprocessors, and first and second busses (14, 15) for connecting the outputs of said first and second memories (8, 9) respectively to said first switch (16);

a first bus (A) for data to connect both said reference microprocessor (MR) and said test microprocessor (MT) in parallel and with the outputs of said first switch (16), and a second or order bus (B) for orders connecting both said reference microprocessor (MR) and said test microprocessor (MT) in parallel and with the outputs of said second switch (21);

first and second counters (17,20), and a third bus (19) having its input connected with said fifth memory (12) containing the number of cycles corresponding to the respective orders and the output connecting said first and second counters (17, 20) in parallel, a fourth bus (26) connecting said third memory (10) with said first counter (17), and a link (18) connecting said first counter (17) and said first switch (16) for controlling said first switch (16); and a fifth bus connecting said second switch (21) to the output of said fourth memory (11), the output of which is connected to said second or order bus (B);

the output of said second counter (20) and said fifth memory (12) being connected to said first counter (17) and through said second counter (20) to said second switch (21) for controlling said second switch (21) to maintain an order for a period of time sufficient for correct execution thereof, and the linking to said first counter makes it possible to send an operation code at the moment when said microprocessors are expecting it after execution of an order;

said memories (8, 9, 10, 11, 12) being loaded by subdividing the total field of each said memory into a certain number of areas of different ranges, depending on the probabilities that it is desired to obtain at the output.

2. The device according to claim 1, wherein said random sequence generator (3) comprises an additional memory (22) in which is stored an initialization sequence for placing said two microprocessors (MR) and (MT) or other compared logic circuits in the same state, before the test, and said additional memory is connected to said first switch (16) by an additional data bus (23), a third counter (24) connected to said additional memory (22) for addressing thereof, and a link (25) connecting said third counter (24) to said first switch (16).

3. The device according to claim 1, wherein the comparator compares the outputs of the test microprocessor (MT) being tested and the outputs of the reference microprocessor (MR) and is effected by a comparison of the "signature" of the test microprocessor (MT) being tested with the "signature" which a good circuit would give, and the device comprises a circuit for performing a compact function or "signature" from the bits constituting the output variables of the logic circuit of the test microprocessor (MT) being tested, transmission busses (c, a, d) connecting the outputs of said test microprocessor (MT) with said comparator (4) for transmission of the variables from the logic circuit of said test microprocessor (MT) to said comparator (4) leaving the circuit of the microprocessor (MT) being tested.

4. The device of claim 1, including independent vector transmission means between said shift register (5) and a first group of memories composed of said first, second and third memories (8, 9, 10) and a second group of memories composed of said fourth and fifth memories (11, 12), said transmission means including a sixth bus (13a) for transmission of a first vector corresponding to bits $b_4$ to $b_{14}$ and a seventh bus (13b) for transmission of a second vector, independent of said first vector, corresponding to bits $b_{15}$ to $b_{25}$, with the total number of bits for said two vectors not exceeding 28.

5. The random testing device of claim 1, wherein said shift register comprises thirty-one cells to provide for said pseudo-random generation of equiprobable vectors.

6. The device as claimed in claim 1, and additionally including a display console (2) connected with said central unit (1) to permit a dialogue with the operator.

7. The device as claimed in claim 1, wherein said reference sequence generator (3) includes means for producing at the output thereof a random sequence of instructions on random data on said first bus (A) and said second bus (B) orders sent in a random manner for application to both said microprocessors.

8. The device as claimed in claim 1, wherein said data output (d), said address output (a) and said monitoring output (c) transmit data, address and monitoring information to said comparator (4), said comparator making a bit by bit comparison of the outputs of said two microprocessors.

9. The device according to claim 3, wherein said random sequence generator (3) comprises an additional memory (22) in which is stored an initialization sequence for placing said two microprocessors (MR) and (MT) or other compared logic circuits in the same state, before the test, and said additional memory is connected to said first switch (16) by an additional data bus (23), a third counter (24) connected to said additional memory (22) for addressing thereof, and a link (25) connecting said third counter (24) to said first switch (16).

10. The device of claim 3, including independent vector transmission means between said shift register (5) and a first group of memories composed of said first, second and third memories (8, 9, 10) and a second group of memories composed of said fourth and fifth memories (11, 12), said transmission means including a sixth bus (13a) for transmission of a first vector corresponding to bits $b_4$ to $b_{14}$ and a seventh bus (13b) for transmission of a second vector, independent of said first vector, corresponding to bits $b_{15}$ to $b_{25}$, with the total number of bits for said two vectors not exceeding 28.

11. The device as claimed in claim 2, wherein said reference sequence generator (3) includes means for producing at the output thereof a random sequence of instructions on random data on said first bus (A) and said second bus (B) orders sent in a random manner for application to both said microprocessors.

12. The device as claimed in claim 3, wherein said reference sequence generator (3) includes means for producing at the output thereof a random sequence of instructions on random data on said first bus (A) and said second bus (B) orders sent in a random manner for application to both said microprocessors.

13. The device according to claim 1, wherein each said memory comprises elementary positions ($m_1, m_2...m_m$) for storing logic vectors, or an equivalent circuit to which are applied input logic vectors ($V_{e1}, V_{e2}...V_{en}$) having different or equal respective occurence probabilities and containing, in respective areas of different ranges, the different categories of output vectors ($V_{s1}, V_{s2}...V_{si}$) so that the occurence probability of a determined output vector ($V_{s1}, V_{s2}...V_{si}$) depends both on the range of the area of memory in which this vector is stored, i.e., on the number of said elementary positions or eight bit bytes that this zone covers, and the respective probabilities ($p_{r1}, p_{r2}...p_{rn}$) of the input vectors ($V_{e1}, V_{e2}...V_{en}$) corresponding to the addresses of the elementary positions ($m_1, m_2...m_n$) of the area of memory in question.

14. The device according to claim 13, including means for time-variable probabilities, using at least one device for transforming the occurence probability of logic vectors, comprising memories (8-12) or equivalent circuits containing the different categories of vectors as well as the information necessary for identifying these different categories, and a sequencer based on logic circuits allowing the sequencing of the different types of vectors in time, as a function of given relationships, the outputs of the memories or equivalent circuits (8-12) being connected, via said switches (16, 21), to at least one of said microprocessors (MR, MT).

* * * * *